(12) United States Patent
Hansen

(10) Patent No.: US 7,216,783 B2
(45) Date of Patent: May 15, 2007

(54) AEROSOL PACKAGE WITH OPTIMAL CONTENT VOLUME

(75) Inventor: Eric J. Hansen, Ada, MI (US)

(73) Assignee: Bissell Homecare, Inc., Grand Rapids, MI (US)

( * ) Notice: Subject to any disclaimer, the term of this patent is extended or adjusted under 35 U.S.C. 154(b) by 451 days.

(21) Appl. No.: 10/711,009

(22) Filed: Aug. 17, 2004

(65) Prior Publication Data

US 2005/0045663 A1    Mar. 3, 2005

Related U.S. Application Data

(60) Provisional application No. 60/481,256, filed on Aug. 18, 2003.

(51) Int. Cl.
*B65D 83/00* (2006.01)
(52) U.S. Cl. .................................. 222/402.1; 222/394
(58) Field of Classification Search ............ 222/402.1, 222/402.18, 394, 395, 396, 397, 389; 220/915, 220/902, 203.1
See application file for complete search history.

(56) References Cited

U.S. PATENT DOCUMENTS

| | | | | |
|---|---|---|---|---|
| 3,918,610 A | * | 11/1975 | Willis | 222/397 |
| 5,211,317 A | * | 5/1993 | Diamond et al. | 222/394 |
| 5,285,916 A | * | 2/1994 | Ross | 220/89.1 |
| 5,423,454 A | * | 6/1995 | Lippman et al. | 222/1 |
| 5,865,337 A | * | 2/1999 | Diamond et al. | 220/619 |
| 2003/0073602 A1 | | 4/2003 | Ramirez et al. | |

* cited by examiner

Primary Examiner—Lien M. Ngo
(74) Attorney, Agent, or Firm—McGarry Bair PC

(57) ABSTRACT

An aerosol package has a container that includes an optimum volume of a gas producing compound, such as an oxidizing compound, without exceeding the potential burst pressure of the container under a worse case scenario. A method for determining the optimum volume of the head space within the container under these conditions and a method for empirically testing the determined volume is described.

16 Claims, 4 Drawing Sheets

12
AEROSOL PACKAGE WITH OPTIMAL CONTENT VOLUME

CROSS-REFERENCE TO RELATED APPLICATIONS

This application claims the benefit of U.S. Provisional Application Ser. No. 60/481,256, filed Aug. 18, 2003.

FIELD OF THE INVENTION

This invention relates to aerosol packages. In one of its aspects, the invention relates to an aerosol package that has a maximum fill volume of a liquid that has a gas-producing compound that may decompose in the presence of certain reagents to produce a gas within the chamber, taking into account a worst-case potential pressure of the gas producing compound therein. In another of its aspects, the invention relates to an aerosol package that includes an optimal volume of a liquid with an oxidizing compound in an aerosol pressurized container. In another of its aspects, the invention relates to a container with a predetermined fill that and has a head space that takes into consideration a worse case scenario for reactants of container contents.

DESCRIPTION OF THE RELATED ART

Aerosol containers typically are filled with stable components and further are pressurized with an aerosol propellant to selectively expel the fill material through a valve assembly. Such stable materials may be filled to any appreciable level and can be expelled on demand by an appropriate addition of propellant.

The performance of cleaning compositions with an oxidizing agent deteriorates over a relatively short time if these compositions are stored together in a single chamber. For example, when an oxidizing agent is added to a cleaning composition containing an activator, the oxidizing agent is stable for only a limited period of time. Instability not only reduces the cleaning effectiveness of the composition but may also lead to increased pressure build-up within the closed chamber to the point where the chamber may buckle or burst. As a result, the unstable compositions tend to be stored in separate containers, thus minimizing the reaction between the compositions and minimizing any pressure build-up within the container.

The Ramirez et al. U.S. Patent Publication No. 2003-0073602-A1, published Apr. 17, 2003, discloses a stable, non-foaming cleaning composition having a solvent system and a surfactant system with a propellant system for delivery of the composition as a non-foaming aerosol spray.

SUMMARY OF THE INVENTION

The invention relates to an aerosol package comprising a container having side walls, a bottom wall and a top wall collectively defining an enclosed chamber having a predetermine volume, the top wall having a valved dispensing outlet, the chamber when closed having a predetermined burst pressure ($P_{burst}$) at a predetermined temperature ($T_{burst}$). An aerosol propellant and a liquid are present in the chamber, the propellant having a predetermined vapor pressure at selected temperatures, and the liquid is adapted to be dispensed through the valved outlet in the chamber under pressure from the propellant. The liquid further comprises a predetermined concentration of a gas-producing compound that is stable in the liquid under controlled conditions but that will decompose in the presence of certain reagents to produce a gas within the chamber. According to the invention, the amount of the liquid of the gas-producing-compound in the container is selected to be the maximum amount of liquid that can safely be loaded into the container without exceeding at least 80% of the burst pressure of the container in a worst case decomposition scenario wherein the gas producing compound is assumed to be completely decomposed and the temperature of the container and contents are at least at ambient temperatures at which the aerosol package is expected to be stored.

In one embodiment, the temperature of the container and contents are assumed to be above the ambient temperatures at which the aerosol package is expected to be stored, preferably in the range of 70–120° F.

In another embodiment of the invention, the amount of the liquid of the gas-producing-compound in the container is selected to be the maximum amount of liquid that can safely be loaded into the container without exceeding at least 90% of the burst pressure of the container in the worst case decomposition scenario.

In another embodiment of the invention, the gas producing compound is a oxygen producing compound, for example, a peroxygen compound. In a preferred embodiment of the invention, the gas producing compound is hydrogen peroxide and the liquid is an aqueous liquid.

The method for calculating the maximum reactant that can be placed within a closed container in a worst case decomposition scenario comprises the steps of determining the volume and strength of a fixed container and calculating a maximum possible pressure generated within the container at a maximum given temperature upon complete decomposition of the reactant within the container that does not exceed the burst strength of the container. In one embodiment of the invention, a method to verify the calculation set forth above comprises the steps of decomposing all of the reactant inside a container, measuring the maximum pressure inside the container, and comparing the measured pressure to the calculated pressure.

The method of calculating the maximum amount of a reactant in a closed aerosol container is based on the gas laws of Boyle and Charles which are most accurate for non condensable gasses under dilute or low pressure conditions. The method of calculating the head space comprises the steps of determining the fixed volume of the closed container, subtracting the volume of the space taken up by the reactant and the propellant, to determine the maximum allowable head space. The main variable in this part of the calculation is to estimate the appropriate amount of reactant as a starting point.

The next step is to determine the theoretical decomposition of the reactant material. First, calculate of the pure active material that can decompose. Next, calculate the volume of released gases at standard temperatures and pressure in accordance Boyles and Charles Law. Next, calculate the theoretical volume of space required from standard temperature and pressure. Next, calculate the pressure in the head space by dividing the decomposed gas volume by the head space volume. This results in the pressure in the remaining head space usually expressed in pounds per square inch.

To further increase the accuracy of the calculation, partial solubility of the reactant and the propellant are taken into account.

Once the pressure in the head space due to decomposition is known, the total maximum pressure within the container is determined by adding the pressure created by the propellant. The primary variables in this equation are the amount of reactant material and the amount of propellant. The maximum fill (reactant plus propellant) of the container is based on a factor of safety associated with the buckle or burst strength of the container. Since the buckle or burst strength of the container is known, the design load pressure can be determined by backing off burst or buckle strength by the appropriate amount. An optimum calculation computes the maximum pressure within the container when the reactant is fully decomposed to a level at or very near burst or buckle strength of the container.

Once the maximum head space is calculated as described above, the calculations are verified with a test method using actual fill products (reactant and propellant). In order to perform this test, a container with a known buckle and burst strength is filled with reactant in the amount previously calculated. An appropriate amount of a contaminate is calculated to achieve a stoichiometric ratio so that all of the reactant decomposes during the reaction. The contaminate is affixed to the bottom of a valve mechanism. The valve mechanism is placed in the opening the container and crimped into place to completely seal the container. Propellent is added through the valve stem to bring the internal pressure up to the desired operating pressure. The contaminate remains clear of the reactant at this stage. The container is inverted and shaken for a few seconds to mix the reactant with the contaminate. The container is returned to the upright position. A pressure monitoring device is attached to the valve stem to measure actual internal pressure. Internal pressure is monitored and recorded over approximately 24 hours. The maximum pressure generated during the test is then compared to the maximum calculated pressure. Ideally, the measured pressure will equal the calculated pressure confirming the accuracy of the calculations. Variations in the measured pressure from the calculated pressure require an adjustment in the amount of reactant added to the container so that the calculated values and the measured values are roughly equivalent.

The preferred method of calculating head space within a container focuses on an oxidizing composition within an aerosol container. However, the method of calculating the decomposition of a reactant and the method of adding a contaminate to a reactant and measuring the pressure can be used for any reactant whose decomposition results in a release of pressurizing material.

DESCRIPTION OF THE PREFERRED EMBODIMENT

Figure 1:
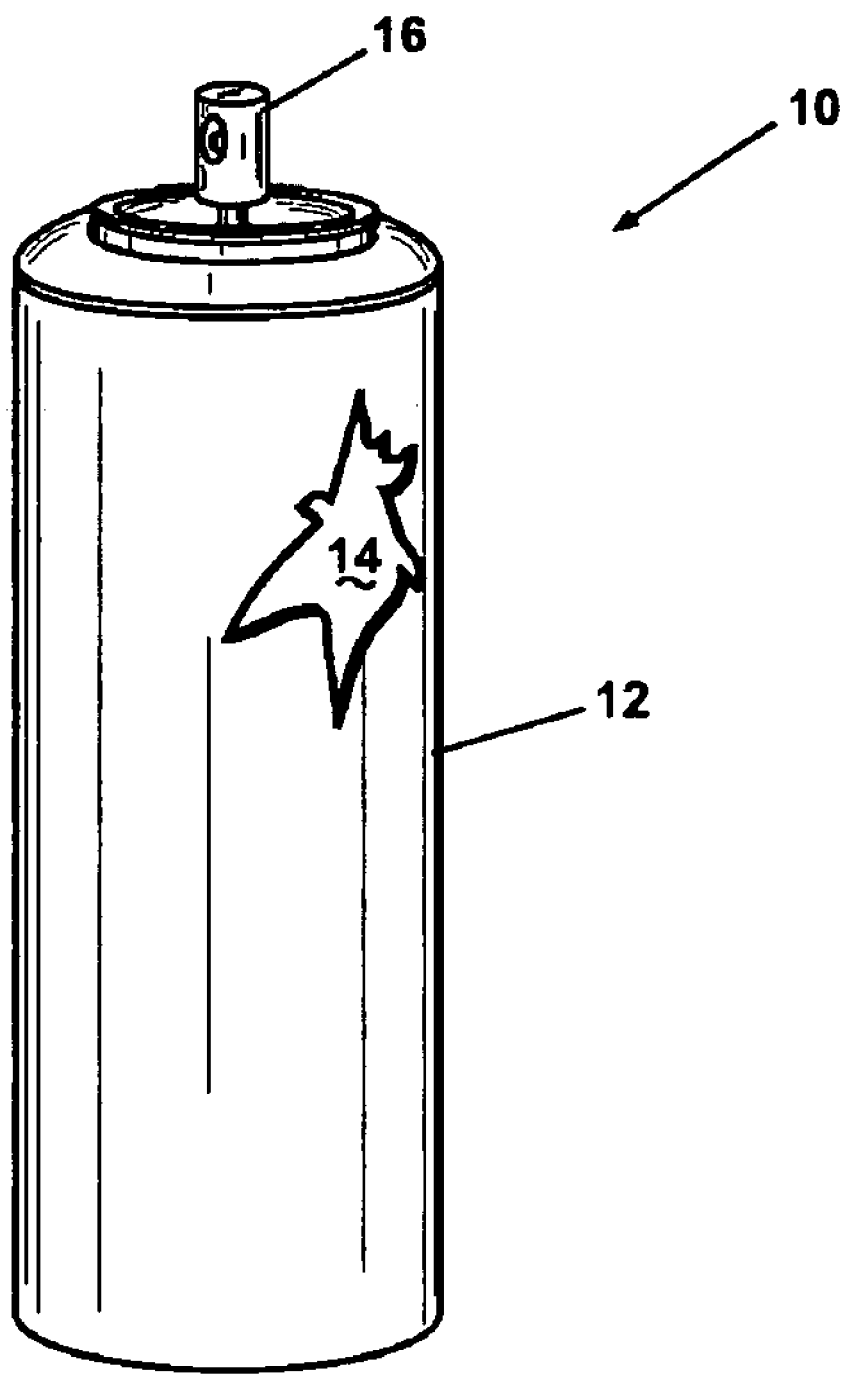
FIG. 1 is a perspective view of an aerosol container according to the invention.
Figure 2:
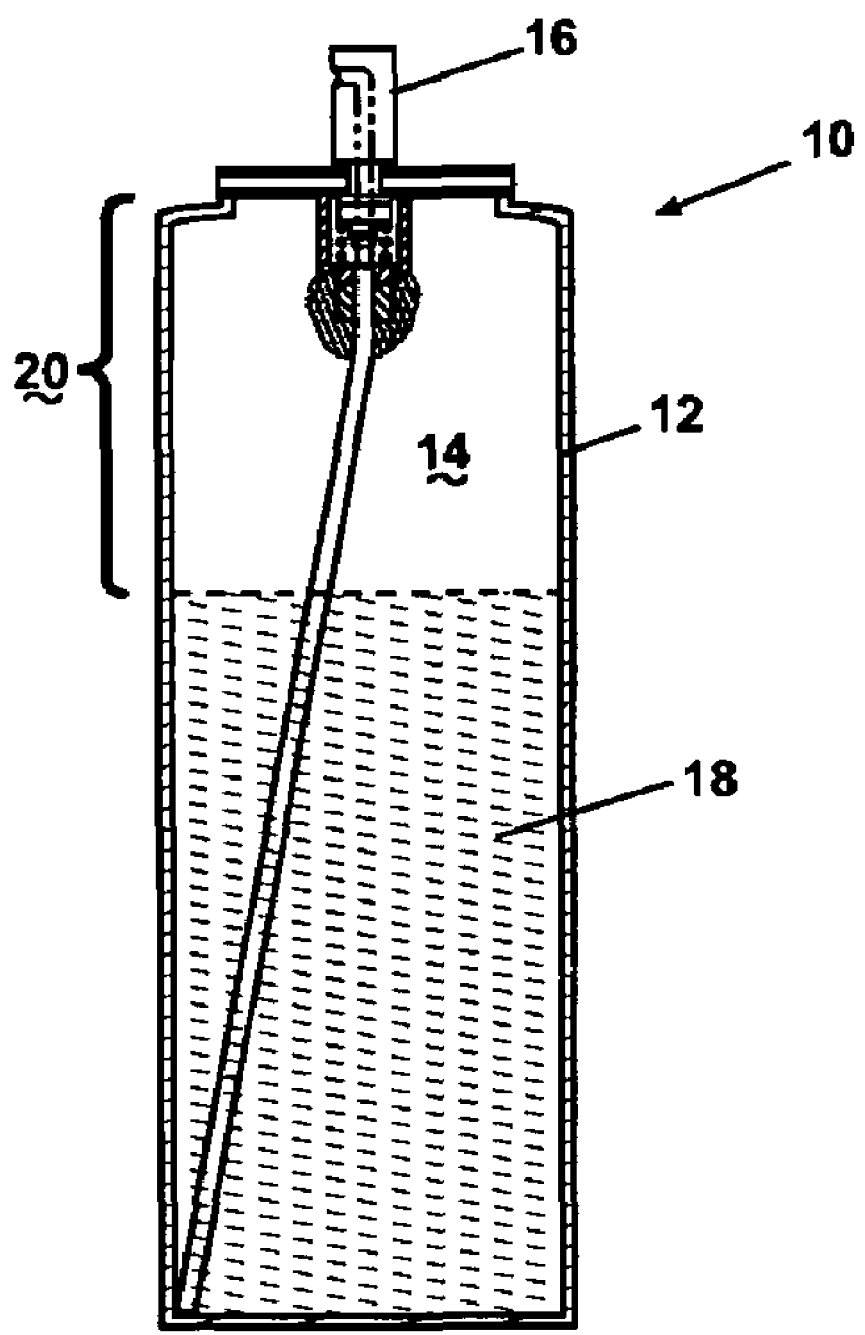
FIG. 2 is a sectional view of the aerosol container illustrated in FIG. 1.
Figure 3:
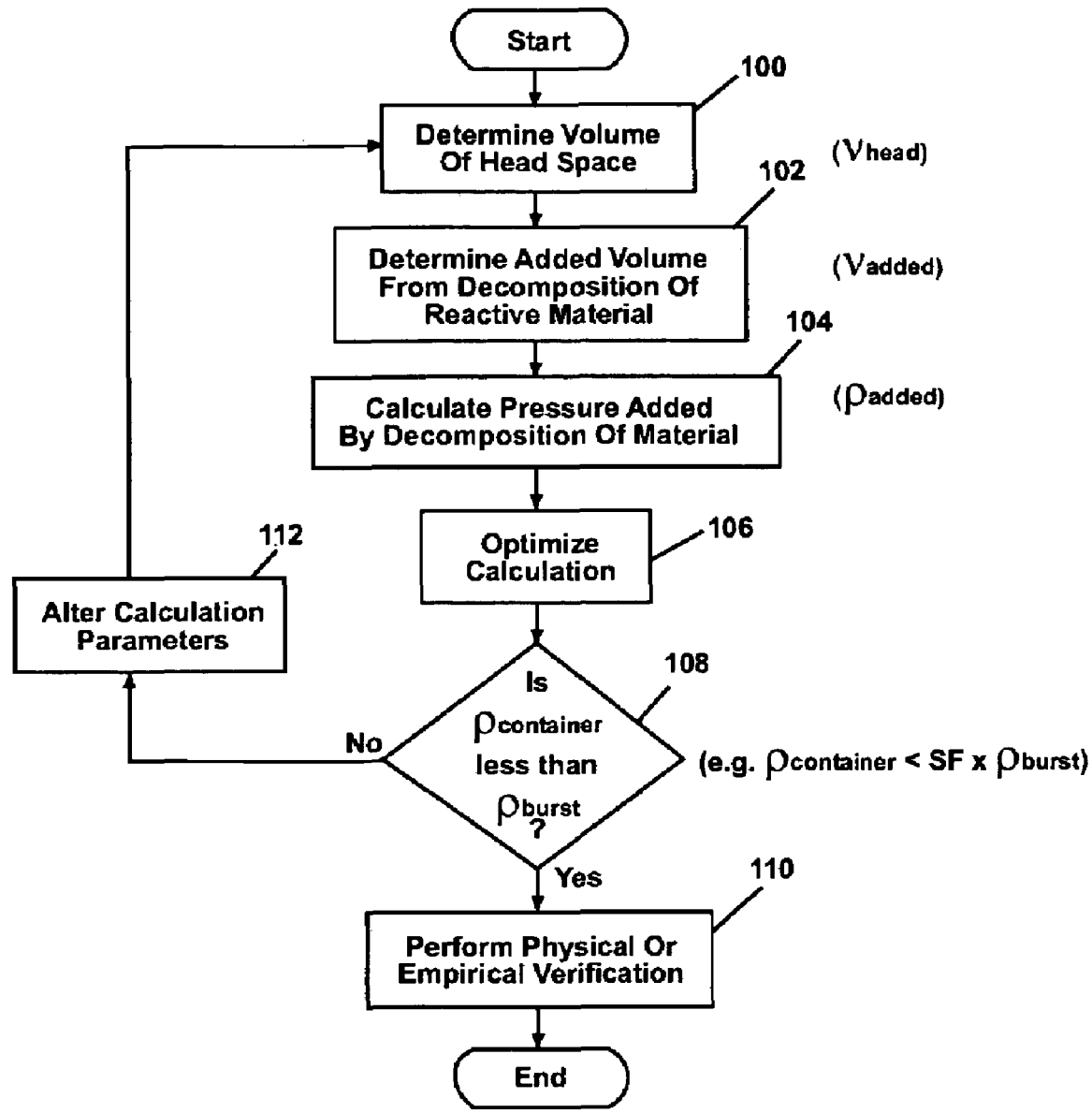
FIG. 3 is a flow chart showing exemplary steps for performing the method of calculating the optimal fill configuration of the container of FIG. 1.

Referring now to the drawings and to FIGS. 1–3 in particular, an aerosol container 10 is shown comprising a cylindrical body 12 which defines a pressurized chamber 14 therein. A conventional value 16 is disposed at one end of the body 12 which is typically actuatable by depressing the valve 16 toward the body which, in turn, expels the contents (if any, shown by reference numeral 18 in the drawings) of the chamber 14 out of the valve until a user releases the downward pressure on the valve. It will be understood that the particular valve embodiment shown in FIGS. 1–3 is exemplary, and that any suitable selectively actuatable valve structure can be employed without departing from the scope of this invention, such valve structure would be apparent to one skilled in the art and familiar with the art relating to aerosol containers.

The contents 18 of the container 10 are generally made up of an oxidizing composition that can be used, for example, with a cleaning composition that is separately packaged and combined during the cleaning process. Typically, as the contents 18 are delivered through the valve, the oxidizing agent is released to increase the cleaning capabilities of the cleaning liquid.

Although the contents 18 of this embodiment are generally described with respect to a preferred composition of an oxidizing compound, it will be understood that the method of determining an optimal fill volume for the container is broadly applicable to numerous compositions, whether or not the contents 18 relate to a cleaning composition.

However, as described above, the cleaning composition is a reactive mixture that will react internally with contaminants that may be present in the container to produce a gas that will pressurize the container 10. This gas causes the internal pressure of the contents 18 within the chamber 14 of the container 10 to increase and, at times, increase beyond the failure limits of the body 12 of the container 10, causing an undesirable failure condition for the container 10. This potential for failure can be managed by providing a substantially large volume of unoccupied "head space" (shown in the drawings by reference numeral 20), typically provided between the attachment of the valve 16 and a top meniscus area of the contents 18 stored therein. Thus, if the gas is released, the gas will increase pressure in the head space 20, but not so much as to cause the body 12 of the container 10 to fail.

However, this head space provision method obviously requires the amount of actual contents 18 provided in the container 10 to be greatly reduced. In order to maximize the value to a consumer of a cleaning composition provided as the contents 18 of the container 10, it is an advantage of this invention to supply as high a volume of the contents 18 as possible within the chamber 14 of the container 10.

Thus, this invention seeks to optimize the volume of the a reactive compound within the container 10 at the time the container 10 is initially filled with the contents 18.

Therefore, if the fill volumes can be optimized, the potential for failure of the container 10 due to an undesirable reaction of the oxidizing agent can be greatly reduced. Restated, this invention relates to an aerosol package in which the allowable head space 20 is minimized and the amount of an oxidizing composition is maximized in an aerosol container 10.

The method for determining the optimal fill contents refers to several variables throughout this description. These variables are defined in Table 1.

| | |
|---|---|
| $V_{container}$ | Volume of the chamber 14 defined within the container 10 |
| $V_{head}$ | Volume of the head space 20 |
| $V_{contents}$ | Volume of the contents 18 |

-continued

| | |
|---|---|
| $P_{burst}$ | Predefined burst (or failure) pressure of the body 12 of the container 10 |
| $P_{head}$ | Pressure of any material contained in the head space 20 |
| $P_{contents}$ | Pressure of the contents 18 at a given time |
| $P_{container}$ | Overall pressure within the chamber 14 of the container 10 at a given time |
| $W_{contents}$ | Weight of the contents 18 in the chamber 14 of the container 10 |
| $(_{contents}$ | Density of the contents 18 in the chamber 14 of the container 10 |
| $W_{deompose}$ | Weight of any decomposing material in the contents 18 which can cause an oxidizing reaction |
| $V_{added}$ | Added volume to chamber 14 of container 10 due to oxidizing reaction (decomposition of reactive material) |
| SF | Safety Factor (ratio of pressure in chamber 14 of container 10 $P_{container}$ to burst pressure $P_{burst}$ of container 10) |

Many of the above-identified parameters of the inventive method described herein are constant values (or reasonably assumed to be constant based on practice). These constant values are also listed at the top of FIG. 3.

The makeup of the respective volumes of materials contained in the chamber 14 and the head space 20 of the container 10 are defined as $V_{container}=V_{head}+V_{contents}$.

The failure pressure (or "burst" pressure) of the body 12 ($P_{burst}$) of the container 10 is typically supplied by the manufacturer of the container 10 as determined during standard testing of the container 10 during manufacture. This can be considered a constant value for determination of the optimal fill volume of the container 10 according to the invention.

Container volumes and strength are defined by container industry standards and Department of Transportation strength requirements such as 2N, 2P, 2Q and 18 bar with 18 bar being the preferred embodiment.

For purposes of calculation the amount liquid fill material that is desired to be delivered to the consumer is assumed. For example, a standard amount of the effective volume of the contents 18 of the container 10 is typically pre-printed on the exterior of the container 10 (e.g., "500 ml", etc.) Thus, based on the equation listed above for the volume of the chamber 14 ($V_{container}$), the values for the volume of the head space 20 ($V_{head}$) and the contents 18 ($V_{contents}$) are fixed constants as well. However, the respective pressures of the contents 18 and the head space 20 are calculated to determine the optimal fill level of the contents 18 ($V_{contents}$) so that the pressure within the chamber 14 of the container 12 ($P_{container}$) does not exceed the burst pressure of the body 12 ($P_{burst}$) of the container 10.

The method according to the invention determines a preferred amount of contents 18 that can actually be placed into the container and still remain within the strength limits of the container. If the amount of assumed material is too high, it is reduced and the calculation process is followed again.

Referring to Table 2, it is first necessary to determine the volume of the head space 20 ($V_{head}$). The head space 20 is defined by the total volume of space available in the container ($V_{container}$) minus the volume taken up by the reactant material and further reduced by the volume of the aerosol propellant vapor pressure. ($V_{contents}$) (see step <100> of FIG. 3). The volume of the fill (reactant and propellant) ($V_{contents}$) is then converted to weight based on density of the materials in the unit grams and expressed as calculated total product density (($_{contents}$). Calculated total product density is then converted to a calculated liquid volume. The calculated volume of the head space 20 ($V_{head}$) is then calculated by subtracting the calculated liquid volume from the net capacity of the container ($V_{head}=V_{container}-V_{contents}$).

The theoretical decomposition of the reactant material ($V_{added}$) can be calculated as follows <102>. First determine the weight of the pure active material in the reactant that can decompose ($W_{decompose}$). The following is an example of this determination. In the case of an oxidizing compound, determine the weight of pure hydrogen peroxide ($H_2O_2$) that exists in the liquid reactant material (at least a portion of the contents 18). By way of example, 170 grams of fill material of a 4% hydrogen peroxide solution in dionized water equates to 6.8 grams of pure hydrogen peroxide and is determined by the formula 170 grams×4%=6.8 grams. Further reducing the total amount of the reactant down to the weight of the active ingredient (in this case: oxygen $O_2$) is accomplished through basic stoichiometric balancing of the equation. For example, the weight of oxygen from total decomposition of 6.8 grams of hydrogen peroxide equals 2.863 grams ($W_{decompose}$).

The weight of the active ingredient is then expressed as a volume ($V_{added}$) at standard temperature and pressure and is available through standard calculations utilizing Boyles and Charles Law. In our particular example, 2.863 grams of oxygen is converted to a volume of 2.005 liters at standard temperature and pressure (0° C. and 1 atm-abs.), and 2.160 liters at 70° F. (21.1° C. and 1 atm-abs.). The pressure of pure oxygen in the chamber 14 of the container 10 is determined by dividing the liters of volume available by the calculated head space volume ($P_{head}=V_{added}/V_{head}$). These theoretical volume calculations may be performed at any temperature, however the generally accepted values are for 70°, 100°, and 120° <104>. However, expected storage temperatures for normal use is in the range of 40–70° F.

In this example, the pressure of oxygen ($P_{head}$) in the container is 2.160 liters divided by 131.2 milliliters resulting in 16.46 atmospheres at 70° F. 16.46 atmospheres at 70° F. equals 241.46 psi.

If left alone, the above calculation may result in a value for ($V_{head}$) that is too high. In order to optimize this calculation, solubility is then taken into account, i.e., Not all of the pure reactant material will decompose and may be distributed throughout the fill material. In this example, the total distribution of oxygen in grams is equal to the amount of oxygen released into the head space plus the dissolved oxygen in the liquid fill. More specifically, 2.863 grams of oxygen equals 2.863 divided by 16.46 atmospheres which equals 0.17394 grams of oxygen in the head space plus 0.007229 grams of oxygen in the liquid fill material. This can be further reduced to show that the pressure resulting from the distribution of oxygen in the head space is 15.8 atmospheres. 15.8 atmospheres at 70° F. equals 231.8 psi <106>.

The total pressure within the container ($P_{container}$) is now calculated by adding in the pressure created by the decomposed reactant ($P_{added}$) to the pounds of force provided by the propellant. In our example, the total internal operating pressure is increased by the 33 psi of the propellant and air plus the 231.8 psi of the decomposed oxygen equaling 264.8 psi at 70° F. This calculated pressure of 264.8 psi is then compared to the buckle or burst strength of the container ($P_{burst}$) to determine if an adequate margin of safety remains <108>.

Figure 4:
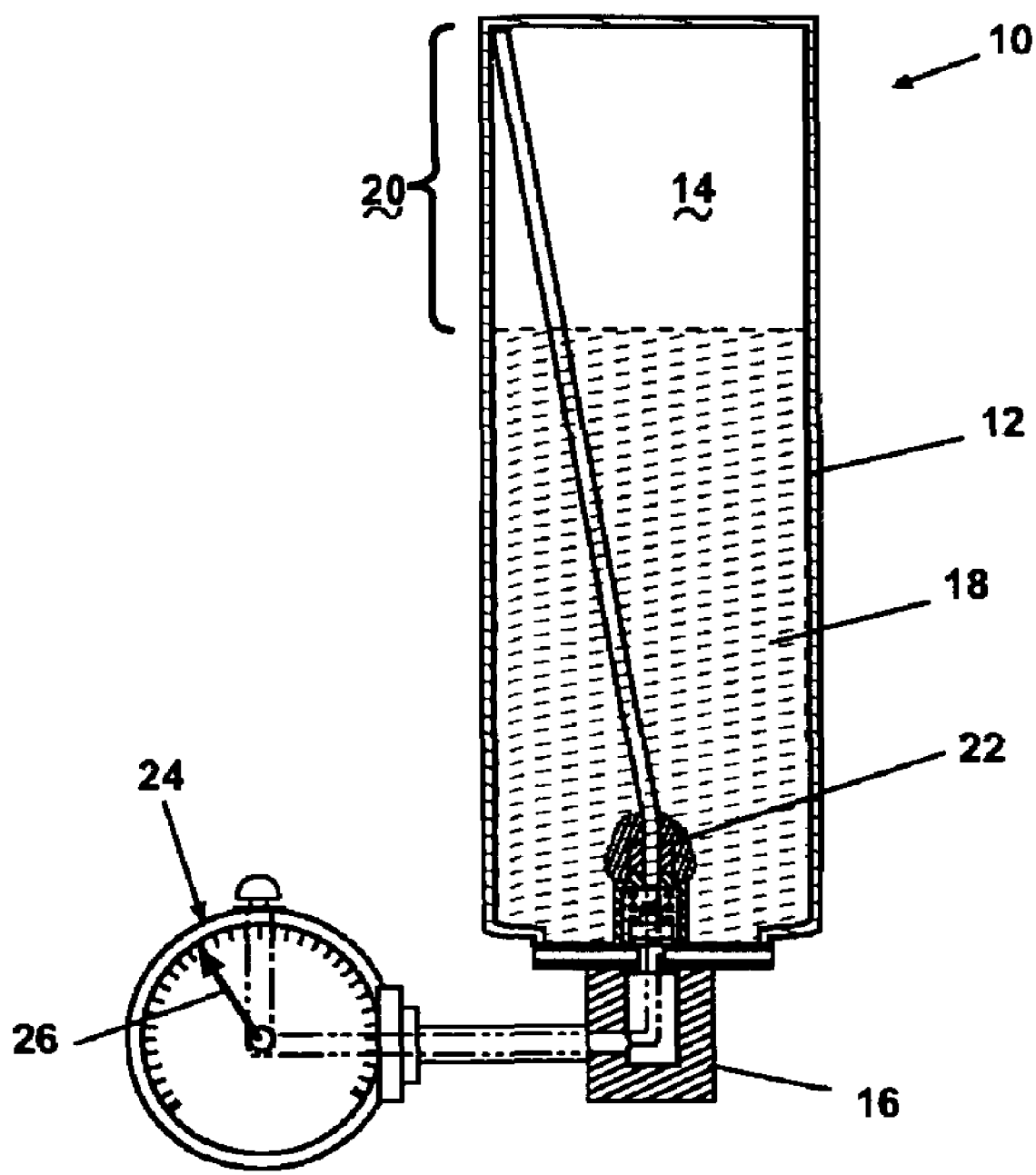
FIG. 4 is a sectional view of the aerosol container of FIG. 1 positioned in an inverted manner and interconnected to an empirical testing device for verifying the calculations according to the invention and as shown in FIG. 3.

If the pressure within the container ($P_{container}$) is less than the burst pressure ($P_{burst}$) thereof (or as corrected by the safety factor SF), processing moves to step <110> in FIG. 3 so that the calculations performed in steps <100>, <102>, <104> and <106> can be empirically verified with a testing apparatus, shown by example in FIG. 4. If not, processing moves to step <112> in FIG. 3 so that various calculation parameters (as described below) can be altered so that a satisfactory head space 20 volume can be obtained.

A typical safety factor SF employed in containers of this type is approximately about 90% which means that $P_{container}$ is designed to be at least 0.9 times less than the failure pressure of the container 10 ($P_{burst}$). If the pressure in the container 10 is not satisfactorily less that the burst pressure of the container 10 (such as that defined by the preferred safety factor SF), the amount of peroxide solution is altered at step <112> in feedback fashion to reach a satisfactory blend of contents and head space 20 volume ($V_{head}$) in the chamber 14 of the container 10.

An empirical test can be performed following the above calculations to verify their accuracy. Referring to FIG. 4, a container 10 of a fixed volume ($V_{container}$) and strength ($P_{burst}$) as in the prior calculation is filled with the given fill (reactant and propellant) material ($V_{contents}$). In our example, we filled the container 10 with a 170 gram mixture of 4% hydrogen peroxide ($H_2O_2$) solution in deionized water. An appropriate amount of contaminate, decomposition catalyst, was selected and inserted into the container 10 to reach a stoichiometric ratio between the contaminate and the active ingredient in the reactant.

For this example, the decomposition catalyst was sodium carbonate to react with the hydrogen peroxide reactant. In this particular example, 2 grams of sodium carbonate was determined to be the proper amount to result in stoichiometric ratio so that all of the catalyst and all of the reactant would react. Referring to FIG. 3, a test apparatus is shown for verifying the calculations described above for determining the optimal head space 20 volume ($V_{head}$). The decomposition catalyst was suspended from the valve 16 in a pouch 22 made from a material that easily dissolves in the fill (such as an ethelyene vinyl alcohol (EVA) pouch, filter paper, cheesecloth, and the like). The pouch 22 is dissolved within 30 seconds upon contact with the contents 18. The decomposition catalyst is preferably suspended within the container 10 in a manner that the catalyst in the pouch 22 does not come in physical contact with the reactant material within the contents 18 until the desired time.

The valve 16 with the suspended catalyst in the pouch 22 was then crimped on the container 10 and propellant was introduced into the container 10 through the valve 16, however the suitable amount of propellant may be added in accordance with other standard aerosol industry procedures such as under-the-cup pressurizing, without departing from the scope of this invention.

Still with reference to FIG. 4, the container 10 was then inverted exposing the reactant material in the contents 18 to the decomposition catalyst within the pouch 22 to cause the reactant material (hydrogen peroxide) to react with the sodium carbonate. To ensure a complete reaction, the container 10 was shaken for an effective period of time (nominally 20 seconds) before being returned to an upright position. A pressure gauge 24 with a suitable indicator 26 thereon was attached to the valve stem to monitor the internal pressure of the container 10 ($P_{container}$).

The amount of time required for a complete reaction to occur varies by reactant and catalyst, however, the sodium carbonate catalyst and the hydrogen peroxide reactant in the example provided herein were allowed to react for 24 hours at 70° F. in order to stabilize. The maximum pressure ($P_{container}$) inside the container was recorded. In this particular experiment, the internal pressure of the container was measured at 265 psi. After stabilization, the container was set in a water bath at temperatures of 100° F. and 120° F. and maximum internal pressures ($P_{container}$) were recorded for those temperatures as well. It is preferred that a number of temperature readings be recorded in order that the maximum pressure within the container 10 (max: $P_{container}$) be determined so that the safe fill volume of the head space 20 ($V_{head}$) can be determined over a wide range of possible temperatures.

The actual measured internal pressure of the container was then compared to the values calculated above for the maximum theoretical container pressure ($P_{container}$). In this experiment, the measured value of 265 lbs. per square inch at 70° F. compared closely to the calculated value of 264.8 lbs. per square inch at 70° F. Thus, the test method verified the calculation and the proposed fill (reactant and propellant) amount can be used with a high degree of confidence that the internal pressure of the container will not exceed the buckle or burst strength of the container.

In sum, the invention relates to a container containing a predetermined volume of reactive contents is shown and described in which an optimized volume of head space between the contents of the container and a dispensing valve outlet in the container is determined so that burst pressure of the container is not exceeded in a worst-case scenario. The invention also relates to a system and method for determining the optimum volume of the head space within the container that contains an aerosol and a reactant component to avoid breaching of the container under a worse-case scenario and a system and method for empirically testing the determined value.

To determine the optimal volume ratio between the contents 18 and the head space 20 within the chamber 14 of the container 10, a container 10 having a predetermined volume and burst pressure is selected. First, the theoretical volume of the head space 20 is determined by the difference between the constant overall volume of the container 10 less the constant volume of the contents 18 desired to be supplied within the container 10 <100>. Next, the increase in volume/pressure by a possible reaction between a reactant component and a contaminant is determined <102>, <104>. Then, the overall increase in pressure within the container 10 due to the reaction is determined. This calculation of the overall increase in pressure is modified to correct for solubility and other corrective factors for this calculation <106>. Finally, the corrected overall increased pressure is compared to the burst pressure of the container 10 (alternatively, as modified by an appropriate safety factor SF) and determined whether the container 10 is satisfactory for delivering the desired volume of the contents <108>. If so, the container 10 can be mass-produced with the desired volume of the contents 18 <110>. If not, a different container 10 is selected with higher-performing parameters (higher burst pressure, higher overall volume, etc) or a reduced volume of the contents 18 is selected (thus, increasing the head space 20 therein) <112>. The calculations are then performed again until the calculated burst pressure (as modified with the appropriate safety factor) is below the burst pressure of the container 10.

The results of the calculation described above can be empirically tested by a testing apparatus shown in FIG. 4 wherein a catalyst to produce the oxidizing reaction is inserted into the container 10 having the predetermined volume of contents 18 therein. The container 10 with the inserted catalyst is activated in a suitable manner to initiate the reaction and the maximum internal pressure within the container 10 is measured. If the measured overall internal container pressure compares favorably with the overall internal pressure calculated above, the container 10 is determined to be a suitable container for delivery of the predetermined volume of contents 18 and the calculation is thereby verified.

Reasonable variation and modification are possible within the foregoing disclosure without departing from the spirit of the invention that is defined in the appended claims.

The invention claimed is:

1. An aerosol package comprising
a container having:
side walls, a bottom wall and a top wall collectively defining an enclosed chamber having a predetermine volume, the chamber having a predetermined burst pressure ($P_{burst}$) at a predetermined temperature ($T_{burst}$), and a valved outlet to selectively dispense the fluid from the container;
an aerosol propellant and a liquid in the chamber, the propellant having a predetermined vapor pressure at selected temperatures;
the liquid further comprising a predetermined concentration of a gas-producing compound that is stable in the liquid under controlled conditions but that will decompose in the presence of certain reagents to produce a gas within the chamber;
wherein the amount of the liquid of the gas-producing-compound in the container is selected to be the maximum amount of liquid that can safely be loaded into the container without exceeding at least 80% of the burst pressure of the container in a worst case decomposition scenario wherein the gas producing compound is assumed to be completely decomposed; and
the temperature of the container and contents are at least at ambient temperatures at which the aerosol package is expected to be stored.

2. An aerosol package according to claim 1 wherein the temperature of the container and contents are assumed to be above the ambient temperatures at which the aerosol package is expected to be stored.

3. An aerosol package according to claim 2 wherein the temperature of the container and contents are assumed to be in the range of 70–120° F.

4. An aerosol package according to claim 3 wherein the amount of the liquid of the gas-producing-compound in the container is selected to be the maximum amount of liquid that can safely be loaded into the container without exceeding at least 90% of the burst pressure of the container in the worst case decomposition scenario.

5. An aerosol package according to claim 4 wherein the gas producing compound is a oxygen producing compound.

6. An aerosol package according to claim 4 wherein the gas producing compound is a peroxygen compound.

7. An aerosol package according to claim 4 wherein the gas producing compound is hydrogen peroxide and the liquid is aqueous.

8. An aerosol package according to claim 1 wherein the temperature of the container and contents are assumed to be in the range of 70–120° F.

9. An aerosol package according to claim 8 wherein the amount of the liquid of the gas-producing-compound in the container is selected to be the maximum amount of liquid that can safely be loaded into the container without exceeding at least 90% of the burst pressure of the container in the worst case decomposition scenario.

10. An aerosol package according to claim 8 wherein the gas producing compound is a oxygen producing compound.

11. An aerosol package according to claim 8 wherein the gas producing compound is a peroxygen compound.

12. An aerosol package according to claim 8 wherein the gas producing compound is hydrogen peroxide and the liquid is aqueous.

13. An aerosol package according to claim 1 wherein the amount of the liquid of the gas-producing-compound in the container is selected to be the maximum amount of liquid that can safely be loaded into the container without exceeding at least 90% of the burst pressure of the container in the worst case decomposition scenario.

14. An aerosol package according to claim 1 wherein the gas producing compound is a oxygen producing compound.

15. An aerosol package according to claim 1 wherein the gas producing compound is a peroxygen compound.

16. An aerosol package according to claim 1 wherein the gas producing compound is hydrogen peroxide and the liquid is aqueous.

* * * * *